United States Patent
Edme et al.

(10) Patent No.: US 9,651,691 B2
(45) Date of Patent: May 16, 2017

(54) METHODS AND SYSTEMS FOR LAND SEISMIC SURVEYING

(71) Applicant: WESTERNGECO L.L.C., Houston, TX (US)

(72) Inventors: Pascal Edme, Cambridge (GB); David Fraser Halliday, Cherry Hinton (GB); Everhard Johan Muijzert, Girton (GB); Julian Edward Kragh, Great Bardfield (GB)

(73) Assignee: WESTERNGECO L.L.C., Houston, TX (US)

( * ) Notice: Subject to any disclaimer, the term of this patent is extended or adjusted under 35 U.S.C. 154(b) by 123 days.

(21) Appl. No.: 14/390,377

(22) PCT Filed: Apr. 2, 2013

(86) PCT No.: PCT/IB2013/052638
§ 371 (c)(1),
(2) Date: Oct. 2, 2014

(87) PCT Pub. No.: WO2013/150452
PCT Pub. Date: Oct. 10, 2013

(65) Prior Publication Data
US 2015/0117149 A1 Apr. 30, 2015

Related U.S. Application Data

(60) Provisional application No. 61/619,853, filed on Apr. 3, 2012.

(51) Int. Cl.
*G01V 1/00* (2006.01)
*G01V 1/24* (2006.01)
*G01V 1/32* (2006.01)

(52) U.S. Cl.
CPC ........... *G01V 1/003* (2013.01); *G01V 1/24* (2013.01); *G01V 1/32* (2013.01)

(58) Field of Classification Search
CPC ............. G01V 1/24; G01V 1/32; G01V 1/003
USPC ...................................... 367/37, 56
See application file for complete search history.

(56) References Cited

U.S. PATENT DOCUMENTS

| 4,611,312 A | 9/1986 | Ikeda | |
|---|---|---|---|
| 6,791,901 B1 * | 9/2004 | Robertsson | G01V 1/003 181/110 |
| 7,492,665 B2 | 2/2009 | Robertsson et al. | |
| 7,876,642 B2 * | 1/2011 | Robertsson | G01V 1/3808 367/38 |

(Continued)

FOREIGN PATENT DOCUMENTS

WO 2010090949 8/2010

OTHER PUBLICATIONS

International Search Report of PCT Application No. PCT/IB2013/052638 dated Jul. 18, 2013: pp. 1-5.

(Continued)

*Primary Examiner* — Daniel L Murphy
(74) *Attorney, Agent, or Firm* — Joan Beckner

(57) ABSTRACT

Methods and apparatuses for land seismic survey are provided. The methods and apparatuses utilize spatial derivatives of a seismic wavefield to interpolate, regularize or extrapolate seismic data. The methods and apparatuses may considerably reduce land seismic field efforts and/or compensate data gaps.

20 Claims, 5 Drawing Sheets

(56) References Cited

U.S. PATENT DOCUMENTS

| | | |
|---|---|---|
| 9,081,111 B2 * | 7/2015 | Amundsen .............. G01V 1/284 |
| 2003/0076741 A1 | 4/2003 | Robertsson et al. |
| 2003/0117894 A1 | 6/2003 | Curtis et al. |
| 2004/0141355 A1 | 7/2004 | Robertsson et al. |
| 2010/0195439 A1 | 8/2010 | Muyzert |
| 2014/0288837 A1 | 9/2014 | Edme et al. |

OTHER PUBLICATIONS

Bagaini et al., "Acquisition and processing of simultaneous vibroseis data," Geophysical Prospecting, 2010, vol. 58: pp. 81-99.

Broggini et al., "The contribution of the spatial derivatives to surface-wave interferometry," SEG San Antonio Annual Meeting, 2011: pp. 3804-3808.

Vassallo et al., "Crossline wavefield reconstruction from multicomponent streamer data: Part 1—Multichannel interpolation by matching pursuit (MIMAP) using pressure and its crossline gradient," Geophysics, Nov.-Dec. 2010, vol. 75(6): pp. WB53-WB67.

Fokkema, J.T, et al., "Seismic Applications of Acoustic Reciprocity", Elsevier, Amsterdam (1993) 352 pp.

* cited by examiner (a) Conventional survey (without gradient).
(b) Sparser survey with additional gradients (sources and/or receivers) acquired.
(c) Survey that can be reconstructed from b) taking advantage of the additional gradients.

(a) One possible route for overcoming an obstruction during land seismic acquisition.
(b) Obtain gradients and then interpolate.
(c) A survey with a large inaccessible survey area.
(d) A survey using gradients to interpolate.

METHODS AND SYSTEMS FOR LAND SEISMIC SURVEYING

CROSS-REFERENCE TO RELATED APPLICATIONS

This application is a U.S. National Stage Application under 35 U.S.C. §371 and claims priority to Patent Cooperation Treaty Application No. PCT/IB2013/052638 filed Apr. 2, 2013, which claims the benefit of U.S. Provisional Application Ser. No. 61/619,853 filed Apr. 3, 2012; both of which are incorporated herein by reference in their entireties.

BACKGROUND

This disclosure relates to geophysical exploration, more specifically it relates to land seismic survey methods and systems.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may not only be conducted in saltwater environments, but also in fresh and brackish waters. In one type of marine survey, called a "towed-array" survey, an array of seismic sensor-containing streamers and sources is towed behind a survey vessel. In one type of survey, called a "marine vertical seismic profile (marine VSP)" survey, an array of sensors is deployed in a borehole and the seismic source is either moving (e.g. towed behind a vessel) or stationary (e.g. suspended from a structure such has a drilling rig). In one type of marine survey, incorporating both hydrophones and geophones, called an "Ocean Bottom Cable (OBC)" survey, sensors are laid on the seabed. In another type of marine survey, the sensors are deployed in other ways and the seismic source is deployed in the water in some way, where the sensors or sources can be either moving or stationary. Other surveys are known as "land" surveys because they are conducted on land environments. Land surveys may use dynamite or seismic vibrators as sources. Arrays of seismic sensor-containing cables are laid on the ground to receive seismic signals. The seismic signals may be converted, digitized, stored or transmitted by sensors to data storage and/or processing facilities nearby, e.g. a recording truck. Land surveys may also use wireless receivers to avoid the limitations of cables. Seismic surveys may be conducted in areas between land and sea, which is referred to as the "transition zone".

Marine surveys and land surveys are very different due to the different operation environments. For example, marine-based measurements are typically based on pressure variations, whereas land-based techniques are typically based on particle motion. Accordingly, the equipment or methods used in land surveys are generally different from those used in marine surveys.

The following references may provide relevant background knowledge. They are incorporated herein by reference for all purposes:

Muyzert: 53.0099-US, US20100195439, Seismic acquisition system and technique

Vassallo, M, Özbek, A., Özdemir, A., K. Eggenberger, 2010. Geophysics, 75, WB53-WB67.

Bagaini, 2010. Acquisition and processing of simultaneous vibroseis data, Geophysical Prospecting, Vol. 58, 81-99.

Robertsson, J. O. A., van Manen, D-J., Halliday, D., Laws, R., 2008. Seismic data acquisition and source-side derivatives generation and application. U.S. Pat. No. 7,492,665 B2.

Broggini, F., Halliday, D., Kragh, E., 2011, The contribution of the spatial derivatives to surface-wave interferometry, SEG Technical Program Expanded Abstracts, 30 (1) pp. 3804-3808.

Fokkema, J. T., van den Berg, 1993. Seismic Applications of Acoustic Reciprocity, Elsevier, Amsterdam.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In this disclosure, land seismic acquisition methods and apparatuses are described. The methods and apparatuses can facilitate a significant efficiency improvement through the measurement and processing of the spatial gradient(s) of the seismic wavefield. Spatial gradients can be obtained by differentiating closely spaced source or receiver point data. Together with conventional seismic data, the source and/or receiver gradients can be used for regularization of the source and/or receiver geometry through interpolation or extrapolation of the seismic data. Interpolation can be used to increase spatial sampling when sensors are spaced beyond the Nyquist wavelength limit, therefore considerably reducing the planning and/or field effort. Regularization can be used to compensate for the gaps in seismic imaging near obstruction zones due to obstacles (such as dunes, building, trees etc., as well as "off-limits" areas e.g. due to permit issues).

Accordingly, in one embodiment a method for land seismic surveying is provided, the method comprising:

deploying composite point sources at respective spaced source points, each composite point source comprising a plurality of spaced sources, and the spacing between the sources in each composite point source allowing source side spatial derivatives of a seismic wavefield to be calculated;

deploying receivers at respective spaced receiver points;

activating the sources to produce the seismic wavefield; and recording corresponding seismic data measured by the receivers.

Thus, in the method, source side spatial derivatives can be calculated. However, receiver side spatial derivatives can be calculated as well. In particular, the deploying of the receivers may be performed by: deploying composite point receivers at the respective spaced receiver points, each composite point receiver comprising a plurality of spaced receivers, and the spacing between the receivers in each composite point receiver allowing receiver side spatial derivatives of the seismic wavefield to be calculated.

Indeed, more generally, in some aspects of the present invention, a land seismic surveying method is provide comprising:

deploying sources at respective spaced source points;

deploying composite point receivers at respective spaced receiver points, each composite point receiver comprising a plurality of spaced receivers, and the spacing between the receivers in each composite point receiver allowing receiver side spatial derivatives of a seismic wavefield to be calculated;

activating the sources to produce the seismic wavefield; and recording corresponding seismic data measured by the receivers.

In further embodiments, respective apparatuses for performing land seismic surveying according to the first and second methods are provided.

Thus, in one embodiment of the present invention, an apparatus for land seismic surveying is provided comprising:

one or more composite point sources deployable at respective spaced source points, each composite point source comprising a plurality of spaced sources, and the spacing between the sources in each composite point source allowing source side spatial derivatives of a seismic wavefield to be calculated;

one or more receivers deployable at respective spaced receiver points; and a recorder which, on production of the seismic wavefield caused by activation of the sources, records corresponding seismic data measured by the receivers.

The apparatus may further, comprise one or more composite point receivers deployable at respective spaced receiver points, each composite point receiver comprising a plurality of spaced receivers, and the spacing between the receivers in each composite point receiver allowing receiver side spatial derivatives of the seismic wavefield to be calculated.

Further embodiments of the present invention provide an apparatus for land seismic surveying comprising:

one or more sources deployable at respective spaced source points;

one or more composite point receivers deployable at respective spaced receiver points, each composite point receiver comprising a plurality of spaced receivers, and the spacing between the receivers in each composite point receiver allowing receiver side spatial derivatives of a seismic wavefield to be calculated; and a recorder which, on production of the seismic wavefield caused by activation of the sources, records corresponding seismic data measured by the receivers.

In certain embodiments, the spacing between the source points may be at least three times, and preferably at least six times, the spacing between the sources in each composite point source.

In some embodiments, the spacing between the sources in each composite point source may be less than one third, and preferably less than one quarter, of the wavelength of the seismic wavefield. However, the spacing may be greater than 1/25, and preferably greater than 1/10, of the wavelength of the seismic wavefield.

In on embodiment, the method may further comprise calculating the source side spatial derivatives. In certain embodiments, the apparatus may further comprise a computer system which calculates the source side spatial derivatives. These derivatives can be calculated during data acquisition in field or later during subsequent data processing. The recorded seismic data can then be interpolated, regularized or extrapolated (e.g. by the computer system) using the source side spatial derivatives.

In embodiments of the present invention, the spacing between the receiver points may be at least three times, and preferably at least six times, the spacing between the receivers in each composite point receiver.

In embodiments of the present invention, the spacing between the receivers in each composite point receiver may be less than one third, and preferably less than one quarter, of the wavelength of the seismic wavefield. However, the spacing may be greater than 1/25, and preferably greater than 1/10, of the wavelength of the seismic wavefield.

In embodiments of the present invention, the method may further comprise calculating the receiver side spatial derivatives. The apparatus may further comprise a computer system which calculates the receiver side spatial derivatives. These derivatives can be calculated during data acquisition in field or later during subsequent data processing. The recorded seismic data can then be interpolated, regularized or extrapolated (e.g. by the computer system) using the receiver side spatial derivatives.

Further optional features of the invention will now be set out. These may be applicable singly or in any combination, and may be applicable with any aspect of the invention.

The spacing between the source points may be greater than the Nyquist distance of the wavefield. For example, the spacing between the source points may be at least the wavelength of the seismic wavefield, and preferably may be at least twice the wavelength of the seismic wavefield.

The spacing between the receiver points may be greater than the Nyquist distance of the wavefield. For example, the spacing between the receiver points may be at least the wavelength of the seismic wavefield, and preferably may be at least twice the wavelength of the seismic wavefield.

The recorded seismic data may comprise one or more selected from the group consisting of: pressure, particle displacement, time-derivatives of particle displacement, particle rotational motion, and time-derivatives of particle rotational motion. The particle displacement, particle rotational motion and time-derivatives thereof may be inline, crossline and/or in the vertical direction.

BRIEF DESCRIPTION OF THE DRAWINGS

Embodiments of this disclosure are described with reference to the following figures. The same numbers are used throughout the figures to reference like features and components. A better understanding of the methods or apparatuses can be had when the following detailed description of the several embodiments is considered in conjunction with the following drawings, in which.

DETAILED DESCRIPTION

Figure 1:
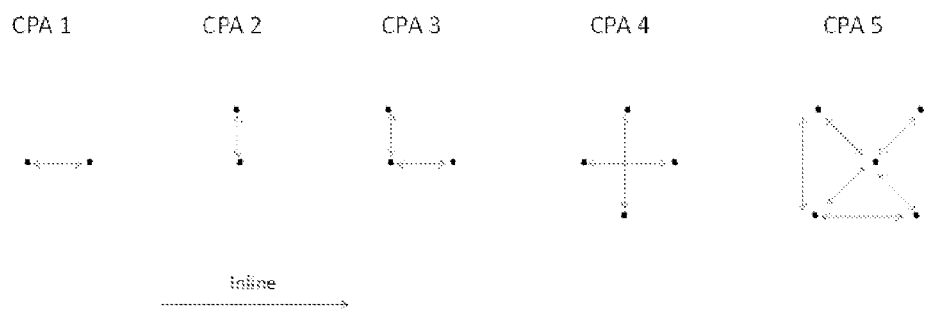
FIG. 1 illustrates several configurations of Composite-Point-Acquisition.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments. Thus the ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In land seismic surveys, there are many different sources or receivers. On the source side, they may include: explosives (dynamite), air-guns and vibrators. In the latter case, the generated source can be compressional (producing mainly P waves and Rayleigh waves), radial-vertical polarized shear (producing mainly $S_V$ and Rayleigh waves) or horizontal polarized shear (producing mainly $S_H$ and Love waves). In this application, the term "source" may include any of the source types, which also may include a single source or a group of simultaneous sources (with closely spaced multiple vibroseis sweeping together for instance). Source point will refer to the central/mean shot position when group of sources are used.

On the receiver side as well, different types exists: geophones measuring ground displacement, ground velocity or ground acceleration, as well as Mems. Geophones are often single component sensors (measuring the vertical motion usually, along the Z axis), but multi-component (3C) geophones also allow to record the wavefield in a vectorial manner along the two additional horizontal axis (inline X and crossline Y, where inline usually refers to the direction of the receiver line). Other seismic receivers can include, among others, a land hydrophone measuring the divergence of the wavefield, or rotational sensors measuring the curl of the wavefield. It will be understood that the term "receiver" may include any seismic sensor device, which may also include a single sensor or group of sensors that are stacked together (in an analog or digital way). Receiver point will refer to central/mean receiver position when a group of receivers is used. Additionally, acquisition points will refer to either receiver or source points.

In order to obtain a multi-dimensional image of the subterranean structure, many acquisition points have to be acquired. Data recorded by many receivers for a single shot is referred to a common-shot gather, while data recorded by a single receiver for multiple shots is referred to a common-receiver gather.

In order to obtain a sub-surface image, the distance between each sources and/or receivers is small enough to avoid spatial aliasing effects that prevent proper processing of the data. The signal of interest (i.e. body waves propagating deep in the earth) need to be properly spatially sampled, as well as the undesirable noise (typically surface-waves, ground-roll) in order to be able to remove it.

For this reason, dense spatial sampling is desirable at least in one domain (i.e. common receiver or shot domain). If possible, both source and receiver sides are densely spatially sampled to allow for the best noise attenuation and therefore the best image to be obtained. But this comes at a high cost (duration of the survey due to the fact that all shot points cannot be acquired simultaneously for instance, and huge field effort to deploy dense pattern of receivers at the surface).

Another potential issue comes from the regularity of the source and/or receiver side geometry. Since conventional imaging processes consist of grouping source-receiver pairs in another domain (common-midpoint gathers), it is desirable to have a regular sampling both on the source and receiver sides. This unfortunately may not be easily achieved in difficult near-surface conditions (dunes, cliffs, steep slopes that make it impossible to place sources and/or receivers, for example) or because of obstructions zones (buildings, trees, issues with permits for example).

As discussed below, one can take advantage of additional gradient data in order to construct denser (unaliased) and more regular (gridded) data (in the receiver and/or the source domain) even by acquiring sparse (potentially aliased), non-uniform or crooked source and/or receiver lines. This is referred to as interpolation and regularization, and this could lead to a significant field effort reduction as well as improve data/image quality.

The methods described below utilize recorded gradients (source and/or receiver side) to improve interpolation/regularization capabilities. Conventional survey methods are not able to deal with spatially aliased wavefields, which means that the wavefield has to be sampled at least twice a wavelength (therefore typically less than 10 m in most surveys, depending on the near-surface elastic properties, to properly sample ground-roll noise). In contrast, the measurement of both the wavefield and its gradient allows one to use the multi-channel sampling theorem for spatial interpolation, which states that a function and its derivative can be interpolated exactly even when these are measured only once a wavelength.

Interpolation Method(s) For example, a wavefield $U_i(x,y,t)$ and its inline gradient $\partial U_i(x,y,t)/\partial x$ (both sampled at the positions $x=x_k$ with $k=1, 2, 3 \ldots$) can be reconstructed at any x-position using the following expression:

$$U_i(x, y, t) = \sum_{k=-\infty}^{\infty} \left\{ U_i(x_k, y, t) + (x - x_k) \frac{\partial U_i(x_k, y, t)}{\partial x} \right\} \left[ \operatorname{sinc}\left( \frac{x}{\Delta x} - k \right) \right]^2 \quad (1)$$

$$(t \in R, k \in Z)$$

Equivalently, a wavefield $U_i(x,y,t)$ and its crossline derivative $\partial U_i(x,y,t)/\partial y$ (both sampled at the positions $y=y_k$ with $k=1, 2, 3 \ldots$) can be reconstructed at any y-position using the following expression:

$$U_i(x, y, t) = \sum_{k=-\infty}^{\infty} \left\{ U_i(x, y_k, t) + (y - y_k) \frac{\partial U_i(x, y_k, t)}{\partial y} \right\} \left[ \operatorname{sinc}\left( \frac{y}{\Delta y} - k \right) \right]^2 \quad (2)$$

$$(t \in R, k \in Z)$$

Where t is time, $\Delta x$ and $\Delta y$ are the existing inline and crossline spatial sampling either in the source or receiver domain. For source side interpolation, the wavefield $U_i$ are organized as common-receiver gathers (x and y corresponding to source point positions). For receiver side interpolation, the wavefield $U_i$ are organized as common-shot gathers (x and y corresponding to receiver point positions).

While conventional recordings require two acquisition points per wavelength to allow proper sampling of the wavefield, the additional gradients enable interpolation of any recorded wavefield $U_i$ at any position between two acquisition points up to a wavelength apart.

Note that equation (1) and (2) theoretically allows for interpolation of uniformly sampled data, but algorithms also exist for non-uniform (random) sampling that can interpolate even more aliased data (like the MIMAP technique, Vassallo et al., 2010). By including the gradient(s) in the interpolation process, larger irregularities in the acquisition geometry (due to any kind of obstacles) can be accurately reconstructed.

Note also that interpolation direction is not limited to the inline and crossline directions only, but in any direction in between. For example, if one want to interpolate along the φ direction (e.g. with a φ angle with respect to the inline direction), the desired gradient is given by $G\phi=G_X \cdot \cos \phi - G_Y \cdot \sin \phi$ where $G_X$ and $G_Y$ are the inline and crossline gradients respectively.

Extrapolation Method(s)

The source and receiver gradients can also be used for extrapolation of the wavefield. A 2D crooked seismic line is considered, for example one that is acquired along a bendy road. The aim of the extrapolation is regularize the source and/or receiver so that all data is projected onto a straighter line. The extrapolation method requires source and/or receiver gradients perpendicular to the main direction of the crooked 2D line. We can now calculate the extrapolated wavefield $U_i$ at a distance d away from the line using the source gradient:

$$U_i(x_s,y_s+d,x_r,y_r,t)=U_i(x_s,y_s,x_r,y_r,t)+d \cdot \partial_s U_i(x_s,y_s,x_r,y_r,t)/\partial y \quad (3)$$

Where $\partial_s$ refers to the source derivative.

A similar expression is used for obtaining an extrapolated wavefield $U_i$ using receiver side gradients.

$$U_i(x_s,y_s,x_r,y_r+d,t)=U_i(x_s,y_s,x_r,y_r,t)+d \cdot \partial_R U_i(x_s,y_s,x_r,y_r,t)/\partial y \quad (4)$$

where $\partial_R$ refers to the receiver derivative.

As this is a first order approximation the quality of the obtained wavefield will be best close to the original receivers and deteriorate when moving away from it, in particular at more than half of the crossline wavelength.

Another option for crossline extrapolation is to consider a wavefield based extrapolation approach. For example, we may consider an extrapolation approach based on representation theorems:

$$U_i(r, s_k) = \sum_s U_i(r, s) \partial_s U_i^*(s_k, s) + \partial_s U_i(r, s) U_i^*(s_k, s) \quad (5)$$

Here, $U_i(r,s)$ is the wavefield due to a source at s recorded at a receiver r, $\partial_s U_i(r,s)_{is}$ the cross-line source gradient of that wavefield, and $s_k$ is the source position we would like to extrapolate the source wavefield to. Equation (3) is not exact for elastic media, but Broggini et al. (2011) have shown that equations of this type can be effective when applied to ground roll data recorded on the Earth's surface. This requires modeled wavefields between the desired source position $s_k$ and the actual source position s, these are $U^*_i(s_k,s)$ and $\partial U^*_i(s_k,s)$ for the modeled source and the modeled source derivative at s. This wavefield can be modeled using local ground roll propagation velocities extracted from the data, allowing equation (5) to extrapolate the ground roll across small distances, e.g., to extrapolate the ground roll noise from a crooked line to a straight line. The inclusion of the gradients in this case ensures that wave fields propagating in different directions are correctly accounted for.

Equation (5) can be used to extrapolate to each desired source position in turn, allowing a crooked source line to be extrapolated to a straight source line. A similar formulation exists for receiver extrapolation; hence both crooked source and receiver lines can be extrapolated to a regular line, which may allow for more effective ground roll noise attenuation. This equation is just one example of wavefield extrapolation; other forms of representation theorem can provide similar expressions (e.g., Fokkema and van den Berg, 1993).

Note again that the interpolated/extrapolated wavefield can be any receiver component. This may be a vertical component geophone (Z), a horizontal geophone component (X and/or Y), or any other component of the wavefield that can be recorded, like, for example, the divergence component (using a land hydrophone device), or any rotational component (Rx and/or Ry and/or Rz, using a rotational sensor). In the latter case, since horizontal components of rotational wavefield already correspond to the spatial gradients of the vertical wavefield, it is then possible to obtain the second-order spatial derivatives, which may be used to interpolate/regularize even more severely aliased wavefields.

In general the data obtained from the interpolated wavefield is more accurate than the data obtained from the extrapolated wavefield. This is because the missing data can be interpolated from source gradients and/or receiver gradients either side of the missing data, as opposed to from only one side of the missing data for the extrapolated wavefield.

Receiver Gradients

There are many ways to obtain gradients. In one example, the receiver side gradient (spatial derivative in a specific direction) is obtained by placing a small number of receivers closely together and calculating the spatial gradient by differentiating (at least) two closely spaced sensors (single component or multi-component) in a given direction, e.g:

$$\frac{\partial_R U_i(x_s, y_s, x_r, y_r, t)}{\partial x} = \frac{U_i(x_s, y_s, x_r, y_r, t) - U_i(x_s, y_s, x_r + d, y_r, y, t)}{d} \quad (6)$$

In order to provide accurate gradients, the distance d between the two differentiated receivers is taken as smaller than about a third of the wavelength of interest (the smallest wavelength if gradient data is desired over the full seismic frequency range). If the survey is limited by the number of available receivers, the survey can be reshot after the receivers have moved to their new (nearby) position. Note that the differentiation may be achieved after or instantaneously during the acquisition (sum of two closely spaced receivers connected with opposite polarity). In the following, the group of sensors used to record both the wavefield and its gradient(s) at the receiver side is called a Composite-Point-Receiver (CPR). Within a CPR, each recording point can be composed of a single sensor (or a multi-component sensor) or a group of sensors (or a multi-component sensor). The distance between each of the CPR is usually considerably larger than the distance within the CPR.

Source Gradients

Similarly, source side gradient refers to the data obtained by differentiating two closely spaced shots, the distance between the two shot points being again about less than a third of the wavelength of interest. For example, one may acquire a first shot gather, then move the source by a small distance in a given direction, then acquire a second shot to finally estimate the source gradient by differentiating the two recorded datasets. Gradients in both horizontal directions can be obtained by firing a source at a third nearby location, away from the line through the first and second source.

$$\frac{\partial_S U_i(x_s, y_s, x_r, y_r, t)}{\partial x} = \frac{U_i(x_s, y_s, x_r, y_r, t) - U_i(x_s + d, y_s, x_r, y_r, y, t)}{d} \quad (7)$$

Alternatively, two closely spaced sources (or two closely spaced group of sources) could directly/simultaneously emit a wavefield with opposite polarity. Note that this gradient generation method does not necessarily speed up the acquisition since, in all cases, two closely spaced shots (non-simultaneous) are required: one for the conventional seismic data, the other for the gradient. From this point of view, the source gradient type of acquisition does not help in reducing the duration of the survey, even if fewer shot points are acquired.

Here, by shot point, we mean the location of the group of sources (shooting simultaneously or not). In the following, the group of sources used to record both the wavefield and its gradient(s) at the source side is called a Composite-Point-Source (CPS). Within a CPS, each point can be composed of a single source or group of sources (fleet). The distance between each of the CPS is usually considerably larger than the distance within the CPS.

One aspect of the methods described here is that the recordings of the wavefield within the source and/or receiver group are well calibrated. As the gradients estimated by equation (6) and (7) are small, any measurement error needs to be minimized.

There are several kinds of corrections that can be applied. First it is important to use well calibrated sensors and sources, so that the impulse responses, both in amplitude and in phase over the useful bandwidth are nearly identical, or at least within 1%. Second, it is preferred to have the sensors planted in a homogenous part of soil in order to minimize difference in wave propagation and coupling. Thirdly, a correction can be applied to the data in order to correct for any error introduced by variations in impulse response, sensor coupling, incorrect positioning etc. Such a correction may be applied to one or more sensors of the group. Example corrections include a timeshift, amplitude scaling, phase shift, scalar, or frequency dependent tilt or azimuth correction. The value of the correction may be data dependent or determined otherwise through the use of GPS or tilt sensors.

As explained above, the additional source gradient helps for interpolation/regularization. Therefore a significant time gain can be achieved on other survey parameters as improved imaging under obstructions is possible, it is easier to permit a survey as fewer shot points are required and fewer shot lines may also be acquired. Note that the proposed gradient type acquisition method can be combined with time efficient simultaneous vibroseis acquisition techniques (Bagaini, 2010).

By regularization, we also mean extrapolation for correcting crooked 2D lines for example. Such acquisition method should result in a dense and regular output dataset without an acquisition footprint, and therefore in a better quality image/information of the sub-surface.

Examples

FIG. 1 shows different examples of Composite-Point-Acquisition (either Source or Receiver) configuration to estimate at least one gradient. Each black point may correspond to a single receiver (or source) or group of receivers (or sources). The (at least) two positions can be recorded simultaneously (if sweeping in opposite phase for the sources) or one after the other. CPA1 provides an inline gradient. CPA2 provides the crossline gradient only. CPA3, 4 and 5 provide both inline and crossline gradients. CPA5 can even provide higher order spatial derivatives. The distance within the CPAs (as shown by the arrows, which are in blue) is chosen to be smaller than about a third of the wavelength of interest. These sketches are just a few examples (alternatives exist).

Figure 2:
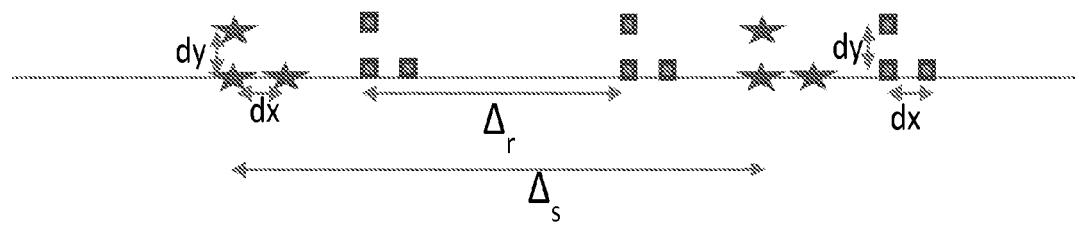
FIG. 2 illustrates an example of a 2D seismic line with source and receiver groups that allow derivation of source and/or receiver gradients in horizontal directions.

FIG. 2 shows the layout of a 2D survey that would allow for both source and receiver gradient calculation in both horizontal directions. A CPA3 is shown in FIG. 2. $\Delta_r$ and $\Delta_s$ are the distances between two adjacent Composite-Point-Acquisition sources and two adjacent Composite-Point-Acquisition receivers respectively. dx and dy are inline and crossline distances between sources or receivers within a Composite-Point-Acquisition. The internal distances within a CPR or CPS dx and dy are much smaller than the distances $\Delta_r$ and $\Delta_s$.

Figure 3:
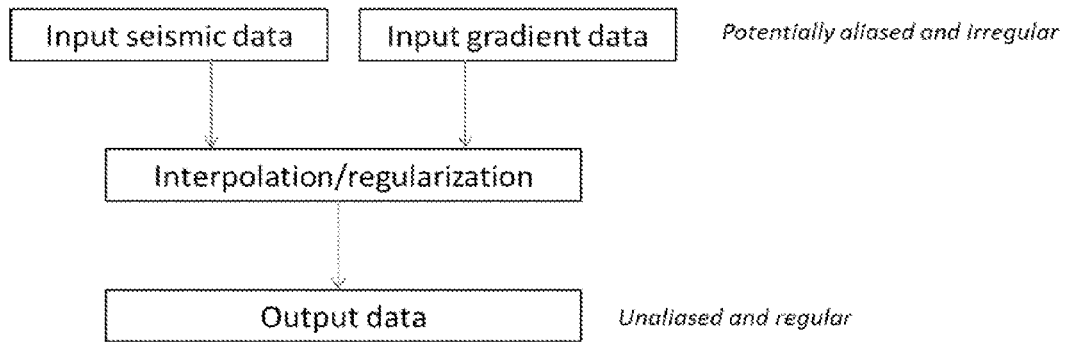
FIG. 3 illustrates a diagram outlining a method for interpolation/regularization of land seismic data, in accordance with an embodiment of the present invention.

The flowchart of FIG. 3 illustrates the process of interpolating data using either source or receiver gradient. Input data are collocated seismic and gradient data (potentially aliased and irregular, with holes). Output data is the interpolated wavefield, i.e. unaliased and regular data. This applies both in the source or receiver domain. Input and outputs are common shot gathers or common receiver gather for receiver side and source side interpolation respectively. The data can be conventional geophone data, multi-component data or new sensor data.

Figure 4:
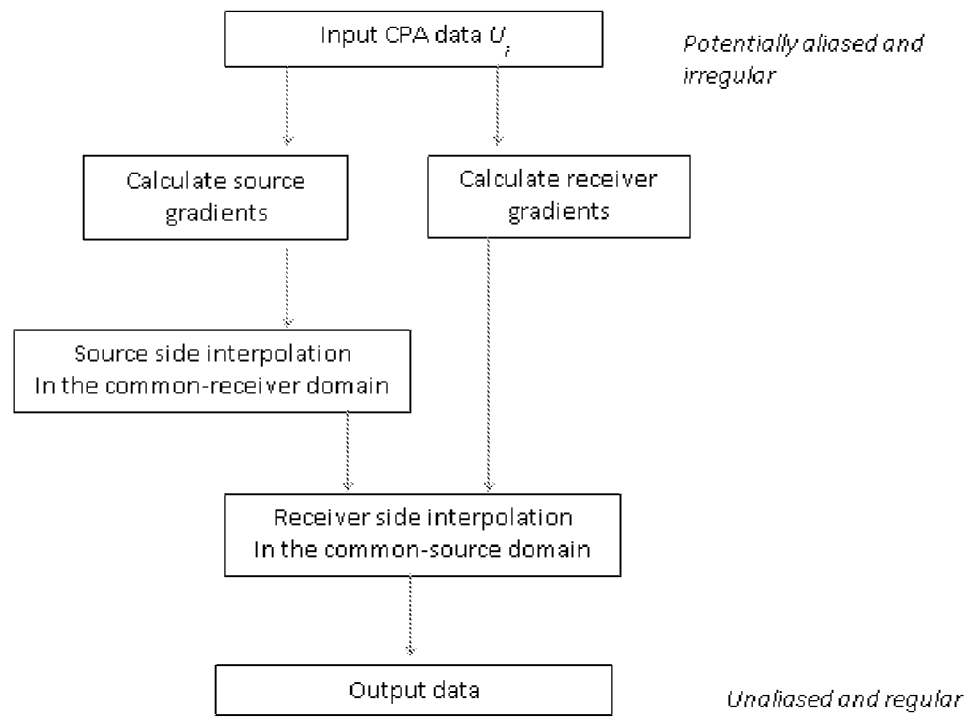
FIG. 4 illustrates another diagram outlining a method for interpolation of a wavefield $U_i$ using both source and receiver side gradients, in accordance with an embodiment of the present invention.

The flowchart in FIG. 4 shows the process of interpolating data using both the source and receiver gradients where the input data are acquired using composite-point acquisition, some of which are illustrated in FIG. 1. In this method as shown in FIG. 4, the source and receiver gradients are first calculated. Next the wavefield is interpolated using the source gradient. Next the interpolated wavefield is further interpolated using the receiver wavefield. Note that receiver side could also be interpolated before the source side. The final result is the regularized, interpolated complete data.

Figure 5:
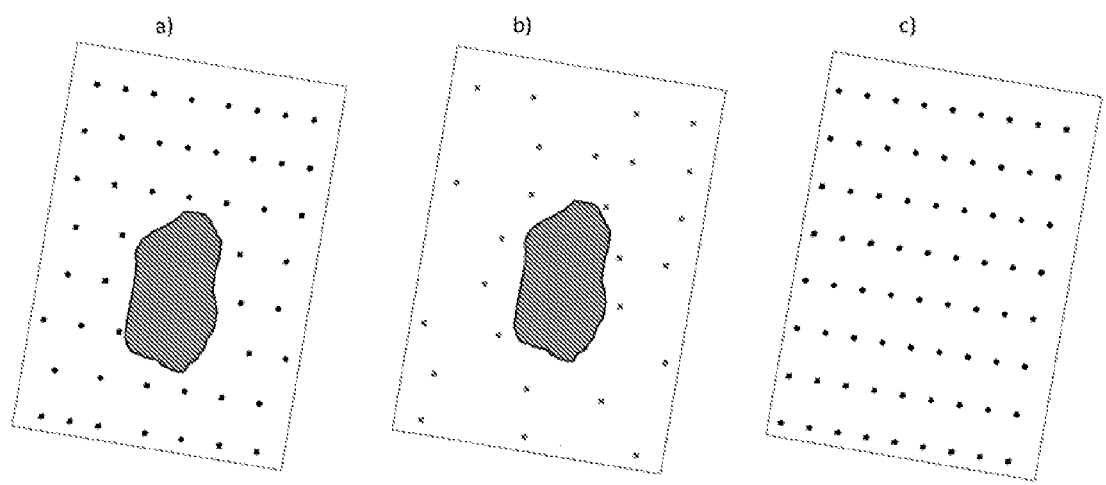
FIG. 5 illustrates examples of land survey configurations.

FIG. 5 illustrates what can be achieved by taking advantage of additional gradient data. The acquisition geometry can be sparser without compromising data quality. Large holes in the geometry can be reconstructed. This applies both for the source and receiver side.

Note that the use of the wavefield gradient does not have to be used over the full survey. Gradient can be estimated only in a few areas where conventional Nyquist sampling acquisition is difficult, expensive or not possible. In addition, in some cases, it may not be necessary to have additional shots and/or receivers in order to estimate the gradients.

FIG. 5a shows a conventional survey without measured gradients. The acquisition can be irregular and contain holes due to obstruction zones (in blue). Each point represents an acquisition point (either source or receiver). The survey result will have data holes where no data are acquired.

FIG. 5b shows a sparser survey with additional gradient acquired (sources and/or receivers). The points (shown as red points) in this FIG. 5b represent acquisition points (source or receiver) where both the wavefield and its spatial derivative are measured. This survey can be sparser than the one in (a) (potentially twice sparser), therefore resulting in a significant planning and field effort reduction.

FIG. 5c shows a survey that can be reconstructed from 5b taking advantage of the additional gradients using one of the methods of interpolation and regularization described above. This applies both for receiver or source points. The large obstruction could not have been reconstructed without gradients.

Figure 6:
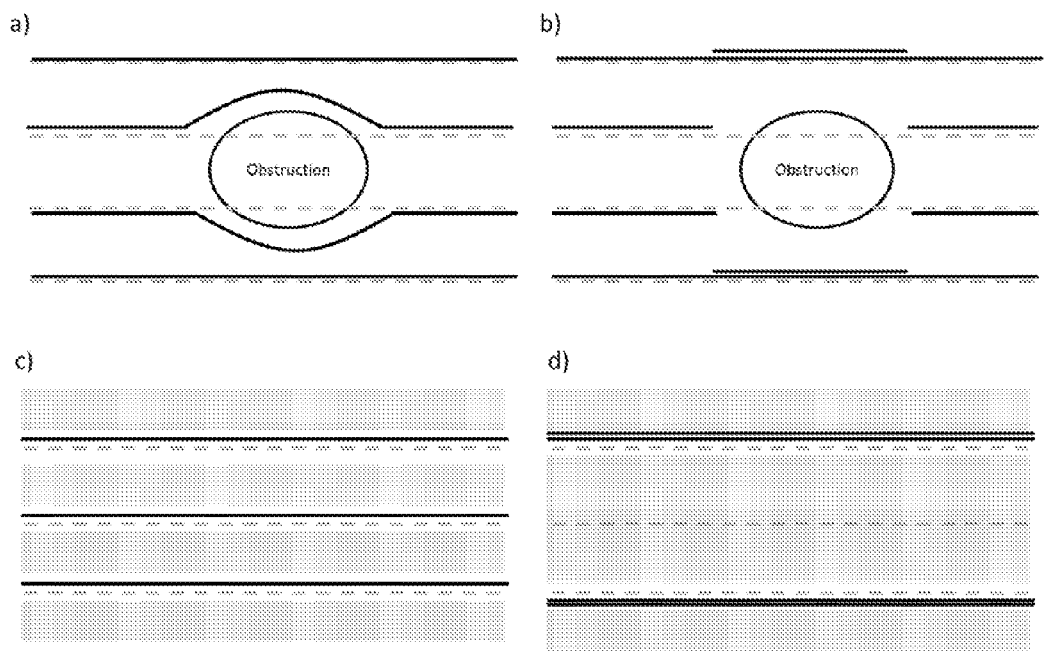
FIG. 6 illustrates more examples of land survey configurations using several methods described above.

FIG. 6 shows further examples where surveys are modified in regions of obstructions, to allow data to be interpolated to desired source/receiver positions. Instead of adding shots (or receivers) for the gradient estimation, the geometry is adjusted in order to obtain the gradients at desired positions. Note that where the obstruction is large, three or more lines may be moved to be close together, and higher order gradients can be used to interpolate over larger distances.

FIG. 6a shows a possible route for overcoming an obstruction during a land seismic acquisition. The desired source or receiver line (dashed grey line) intersects an obstruction. This may be a topographic feature (e.g., a sand dune), near-surface infrastructure, or an un-permitted area. The actual source or receiver line deviates from the desired (black dashed line). There will be a data hole in the area where the obstruction resides.

FIG. 6b shows another survey using a method described above. Instead of simply deviating the lines around the obstruction, the deviated portion (solid black line) of the line is moved next to the nearest unaffected line (solid black lines above and below the obstruction), allowing a cross-line gradient to be computed. This gradient can be used to interpolate the sources/receivers to the desired position within the obstruction.

FIGS. 6c and 6d show another situation. In FIG. 6c, the solid gray areas represent an inaccessible part of the survey area. For example, this may be due to a mine field, or vegetation. Where possible an area is cleared (white gaps) allowing seismic lines to be shot.

Rather than creating a clearing for each desired source and receiver line as in FIG. 6c, every other source and receiver line can be cleared. Two closely spaced lines are then located in each clearing (solid black lines), allowing interpolation to the desired line in the uncleared area (grey dashed line).

Figure 7:
FIG. 7 illustrates an example for using a method acquiring data for a crooked line in accordance with an embodiment of the present invention.

FIG. 7 illustrates the acquisition geometry and extrapolation points for a crooked line. The sources are indicated by the filled stars, the receivers are indicated by the filled squares. The open symbols represent the locations to which the data is extrapolated. So the resulting data are alone a straight line, rather than the actual crooked line.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

Numbered Clauses Relating to Further Optional Features of Some Embodiments of the Invention 1. A method for land seismic surveying that includes wavefield gradients, the method comprising:
Deploying sources at Composite Point Source (CPS);
Deploying receivers at Composite Point Receiver (CPR); and
Activating sources and recording seismic data at receivers.

2. The method as in clause 1, further comprising:
  obtaining receiver side gradients; or
  obtaining source side gradients.
3. The method as in clause 2,
  Wherein obtaining receiver side gradients or obtaining source side gradients is performed during data acquisition in field.
4. The method as in clause 2,
  Wherein obtaining receiver side gradients or obtaining source side gradients is performed during data processing.
5. The method as in clause 2, further comprising:
  interpolating or regularizing or extrapolating recorded seismic data.
6. The method as in clause 1,
  wherein the recorded seismic data comprises one or more of the group of pressure, particle displacement in inline, crossline or vertical direction or their time-derivatives; particle rotational motion in in inline, crossline or vertical direction or their time-derivatives.
7. The method as in clause 1,
  wherein the distance between adjacent composite points sources is greater than Nyquist distance; or
  wherein the distance between adjacent composite points receivers is greater than Nyquist distance.
8. A system for land seismic survey that include wavefield gradients, the system comprising:
  Multiple sources;
  Multiple receivers;
  At least one recorder;
  Wherein multiple sources form composite points sources (CPS) when deployed;
  Wherein multiple receivers form composite points receivers (CPR) when deployed
  Wherein when sources are activated, the recorder stores seismic data from receivers.

The invention claimed is:
1. A method for land seismic surveying comprising:
  deploying composite point sources at respective spaced source points, each composite point source comprising a plurality of spaced sources wherein the spacing between the sources in each composite point source is less than one third of the wavelength of the seismic wavefield and allows source side spatial derivatives of a seismic wavefield to be calculated;
  deploying receivers at respective spaced receiver points;
  activating the sources to produce the seismic wavefield;
  recording corresponding seismic data measured by the receivers;
  calculating the source side spatial derivatives at individual composite point sources; and
  interpolating, regularizing or extrapolating the recorded seismic data using the calculated source side spatial derivatives, and thereby reconstructing seismic data for data points spaced from the composite point sources.
2. The method of claim 1, wherein the spacing between the source points is at least three times the spacing between the sources in each composite point source.
3. The method of claim 1, wherein:
  the deploying of the receivers is performed by: deploying composite point receivers at the respective spaced receiver points, each composite point receiver comprising a plurality of spaced receivers, wherein the spacing between the receivers in each composite point receiver is less than one third of the wavelength of the seismic wavefield and allows receiver side spatial derivatives of the seismic wavefield to be calculated.
4. The method of claim 3, wherein the spacing between the receiver points is at least three times the spacing between the receivers in each composite point receiver.
5. The method of claim 3 further comprising calculating the receiver side spatial derivatives at individual composite point receivers; and interpolating, regularizing or extrapolating the recorded seismic data using the calculated receiver side spatial derivatives so as to reconstruct seismic data for an array of data points in which the number of data points is greater than the number of composite point receivers.
6. The method of claim 3 further comprising calculating the receiver side spatial derivatives at individual composite point receivers; and interpolating, regularizing or extrapolating the recorded seismic data using the calculated receiver side spatial derivatives so as to reconstruct seismic data for an array of data points in which the locations of the data points are more regularly arranged than the locations of the composite point receivers.
7. The method of claim 1, wherein the spacing between the source points is greater than the Nyquist distance of the wavefield.
8. The method of claim 1, wherein the spacing between the receiver points is greater than the Nyquist distance of the wavefield.
9. The method of claim 1, wherein the recorded seismic data comprises one or more selected from the group consisting of: particle displacement, time-derivatives of particle displacement, particle rotational motion, and time-derivatives of particle rotational motion.
10. The method of claim 1 wherein interpolating, regularizing or extrapolating the recorded seismic data reconstructs seismic data for an array of data points in which the number of data points is greater than the number of composite point sources.
11. The method of claim 1 wherein interpolating, regularizing or extrapolating the recorded seismic data reconstructs seismic data for an array of data points in which the locations of the data points are more regularly arranged than the locations of the composite point sources.
12. A method for land seismic surveying comprising:
  deploying sources at respective spaced source points;
  deploying composite point receivers at respective spaced receiver points, each composite point receiver comprising a plurality of spaced receivers, wherein the spacing between the receivers in each composite point receiver is less than one third of the wavelength of the seismic wavefield and allows receiver side spatial derivatives of a seismic wavefield to be calculated;
  activating the sources to produce the seismic wavefield;
  recording corresponding seismic data measured by the receivers;
  calculating the receiver side spatial derivatives at individual composite point receivers; and
  interpolating, regularizing or extrapolating the recorded seismic data using the calculated receiver side spatial derivatives and thereby reconstructing seismic data for data points spaced from the composite point sources.
13. The method of claim 12 wherein interpolating, regularizing or extrapolating the recorded seismic data measured by the receivers reconstructs seismic data associated with an array of data points in which the number of data points is greater than the number of composite point receivers.
14. The method of claim 12 wherein interpolating, regularizing or extrapolating the recorded seismic data measured by the receivers reconstructs seismic data associated with an array of data points in which the locations of the data points are more regularly arranged than the locations of the composite point receivers.

15. The method of claim 12, wherein the spacing between the source points is greater than the Nyquist distance of the wavefield.

16. The method of claim 12, wherein the spacing between the receiver points is greater than the Nyquist distance of the wavefield.

17. The method of claim 12, wherein the recorded seismic data comprises one or more selected from the group consisting of: particle displacement, time-derivatives of particle displacement, particle rotational motion, and time-derivatives of particle rotational motion.

18. An apparatus for land seismic surveying comprising:
one or more composite point sources deployable at respective spaced source points, each composite point source comprising a plurality of spaced sources, and the spacing between the sources in each composite point source allowing source side spatial derivatives of a seismic wavefield to be calculated;
one or more receivers deployable at respective spaced receiver points;
a recorder which, on production of the seismic wavefield caused by activation of the sources, records corresponding seismic data measured by the receivers; and
a computer system which calculates the source side spatial derivatives at individual composite point sources and interpolates, regularizes or extrapolates the recorded seismic data using the calculated source side spatial derivatives so as to reconstruct seismic data for data points spaced from the composite point sources.

19. The apparatus of claim 18, comprising:
one or more composite point receivers deployable at respective spaced receiver points, each composite point receiver comprising a plurality of spaced receivers, and the spacing between the receivers in each composite point receiver allowing receiver side spatial derivatives of the seismic wavefield to be calculated.

20. An apparatus for land seismic surveying comprising:
one or more sources deployable at respective spaced source points;
one or more composite point receivers deployable at respective spaced receiver points, each composite point receiver comprising a plurality of spaced receivers, and the spacing between the receivers in each composite point receiver allowing receiver side spatial derivatives of a seismic wavefield to be calculated;
a recorder which, on production of the seismic wavefield caused by activation of the sources, records corresponding seismic data measured by the receivers; and
a computer system which calculates the receiver side spatial derivatives at individual composite point receivers and interpolates, regularizes or extrapolates the recorded seismic data using the calculated receiver side spatial derivatives so as to reconstruct seismic data for data points spaced from the composite point receivers.

* * * * *